US011292505B1

(12) United States Patent
Williams

(10) Patent No.: US 11,292,505 B1
(45) Date of Patent: Apr. 5, 2022

(54) CYRUS CAR CONVERTER

(71) Applicant: Victoria Williams, Philadelphia, PA (US)

(72) Inventor: Victoria Williams, Philadelphia, PA (US)

( * ) Notice: Subject to any disclaimer, the term of this patent is extended or adjusted under 35 U.S.C. 154(b) by 0 days.

(21) Appl. No.: 16/873,389

(22) Filed: Mar. 10, 2021

(51) Int. Cl.
  *B62D 1/02* (2006.01)
  *B62D 1/22* (2006.01)
  *B60K 26/02* (2006.01)

(52) U.S. Cl.
  CPC ............... *B62D 1/22* (2013.01); *B60K 26/02* (2013.01)

(58) Field of Classification Search
  CPC ... B62D 1/02; B62D 1/22; H01H 3/14; H01H 3/141; H01H 2003/147; H01H 13/16
  See application file for complete search history.

(56) References Cited

U.S. PATENT DOCUMENTS

| | | | | |
|---|---|---|---|---|
| 4,795,862 A * | 1/1989 | Linden | ............... | H01H 25/041 200/5 R |
| 5,618,212 A * | 4/1997 | Moore | ............... | H01H 3/14 200/303 |
| 5,837,952 A * | 11/1998 | Oshiro | ............... | G06F 3/0219 200/86 R |
| 7,122,751 B1 * | 10/2006 | Anderson | ............... | A63F 13/06 200/85 R |
| D597,143 S * | 7/2009 | Izumi | ............... | D14/388 |
| 8,100,770 B2 * | 1/2012 | Yamazaki | ............... | A63F 13/214 463/39 |
| 2005/0224272 A1 * | 10/2005 | Crawford | ............... | B62D 1/12 180/308 |
| 2006/0284839 A1 * | 12/2006 | Breed | ............... | B62D 1/046 345/156 |
| 2008/0004111 A1 * | 1/2008 | Prather | ............... | A63F 13/213 463/36 |

(Continued)

*Primary Examiner* — Richard W Ridley
*Assistant Examiner* — Brian J McGovern

(57) ABSTRACT

An adjustable pedal apparatus for a motor vehicle is provided. The apparatus includes a pedal that can be translated in a longitudinal fashion parallel to the vehicle floor. The apparatus includes a pedal pivotally attached to a pivot pin. The pivot pin is threadedly attached to a powered screw to allow translation thereon in response to rotation of the screw. The pivot pin is received in a second longitudinal slot formed in a base formation. An attachment link is pivotally attached to the pivot pin and includes an elongated opening for receiving a driving pin and a pushrod attachment. Driving pin and pushrod attachment are free to slide and pivot with their attachment to the attachment link. A power link is also provided. The power link is pivotally attached to the pedal at an elevation lower than the pivot pin. The power link also includes an elongated opening. The power link opening is adapted to receive the driving pin as well as a stationary pin disposed at an elevation comparable with the pivot pin of the pedal. Both the driving pin and the stationary pin are capable of sliding and rotating within the elongated opening of the power link. As the pedal is depressed the power Link forces the driving link rearward, and the driving pin in connection with the attachment link and pivot pin drive the pushrod to activate the desired function of the vehicle. This operation of the pushrod holds true irrespective of the location of the pivot pin on the powered screw.

2 Claims, 1 Drawing Sheet

(56) References Cited

U.S. PATENT DOCUMENTS

| | | | | |
|---|---|---|---|---|
| 2012/0283929 A1* | 11/2012 | Wakita | ................... | B60N 2/75 |
| | | | | 701/99 |
| 2014/0188338 A1* | 7/2014 | Ito | ......................... | B62D 51/02 |
| | | | | 701/41 |
| 2014/0328469 A1* | 11/2014 | Lee | ...................... | A61B 6/467 |
| | | | | 378/205 |

* cited by examiner

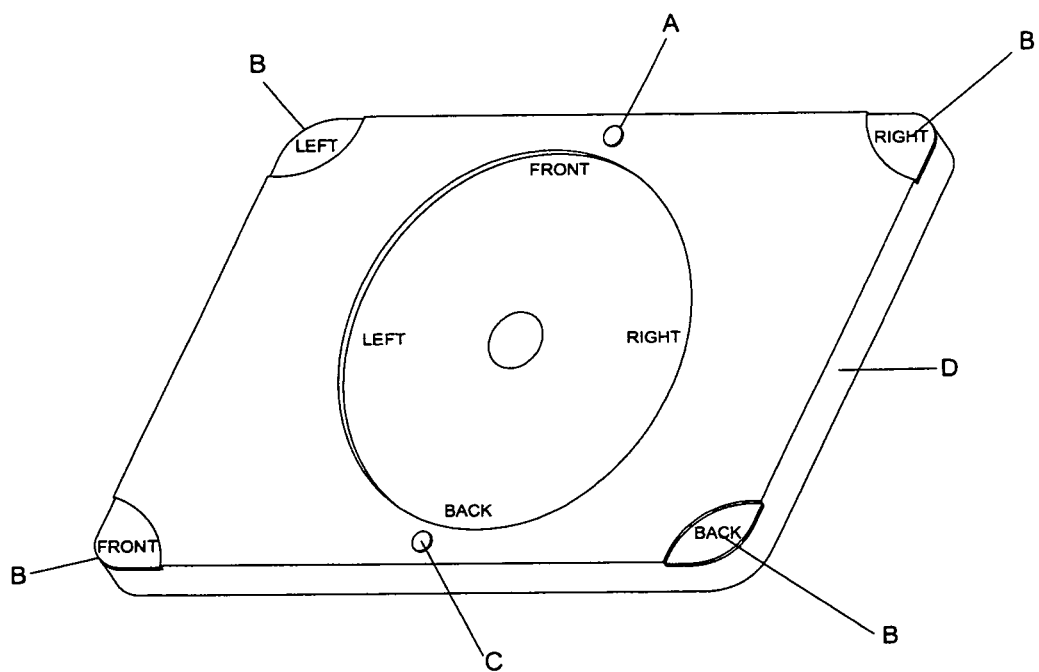

CYRUS CAR CONVERTER

BACKGROUND

This field of endeavor to which it pertains a car converter, that will replace a steering wheel. In this general idea this claimed invention.

SUMMARY

The Embodiments

1. The device have open face parts that is able to reveal its face parts.
2. All of the parts are intent to be the same size and all the same length and diameter of all dimensions.
3. It is square like for portion and is a flat light replacement on the floor of the car.

BRIEF DESCRIPTION OF THE DRAWINGS

FIG. 1 shows a perspective view of the cyrus car converter.

DETAILED DESCRIPTION OF THE INVENTION

The main purpose of the Cyrus Car Converter is to provide an automobile converter, specifically to authorize a person to not have to physically steer, gas and/or brake a vehicle. Automobiles are essential forms of transportation to supply individuals with a method of how to travel to various destinations locally and/or around the country. However modern cars today, persons will have to physically steer the vehicle as well as press on the gas and brake pedal to function the vehicle in the direction desired by a personage. This often causes individuals to manually drive a vehicle while creating a less beneficially method of driving an automobile. Ingenious and practical, the Cyrus Car Converter is an automobile converter with a four-step foot motion panel that does not require a driver to manually steer and utilize a gas or brake pedal to function a vehicle. The Cyrus Car Converter is a small box that will be connected to a power source of the motor car as well as wires connected to a light panel to guide a driver to move in a right, left, forward and back direction. This converter will possess a four-step foot motion panel with labeled directions that will be positioned on each corner of the box converter, the left and right directional buttons is stationed on the top two corners while the front and back directional buttons is on the bottom corners of the device. In the center of the device, there is an additional circular direction panel: front, right, back, left in a clockwise direction that are consider blinker pedals. These features aid motorist to not have to physically steer, gas or brake the vehicle compared to the traditional method of driving a car. Furthermore, the Cyrus Car Converter will also include an on and off button to support the functionality of the apparatus to operate effectively when in use or appropriately turned off. The Cyrus Car Converter may prove to be a necessity to all motorist who seek to reduce the manual labor of driving a vehicle to numerous destinations with advanced technology. It may also be a benefit in the automotive industry.

I claim:

1. An automobile steering device comprising:
   a box shaped body configured to connect to a power source of an automobile;
   a left directional button disposed in a first top corner of the box shaped body;
   a right directional button disposed in a second top corner of the box shaped body;
   a front directional button disposed on a first bottom corner of the box shaped boy; and
   a rear directional button disposed on a second bottom corner of the box shaped body, wherein the automobile steering device is configured to be installed in the floor of the automobile.

2. The automobile steering device, according to claim 1 further comprising:
   an on button located on the box shaped body; and
   an off button located on the box shaped body.

* * * * *